Sept. 4, 1923.  N. O. HARMON  1,467,285
HYDRAULIC CLASSIFIER
Filed Oct. 24, 1921
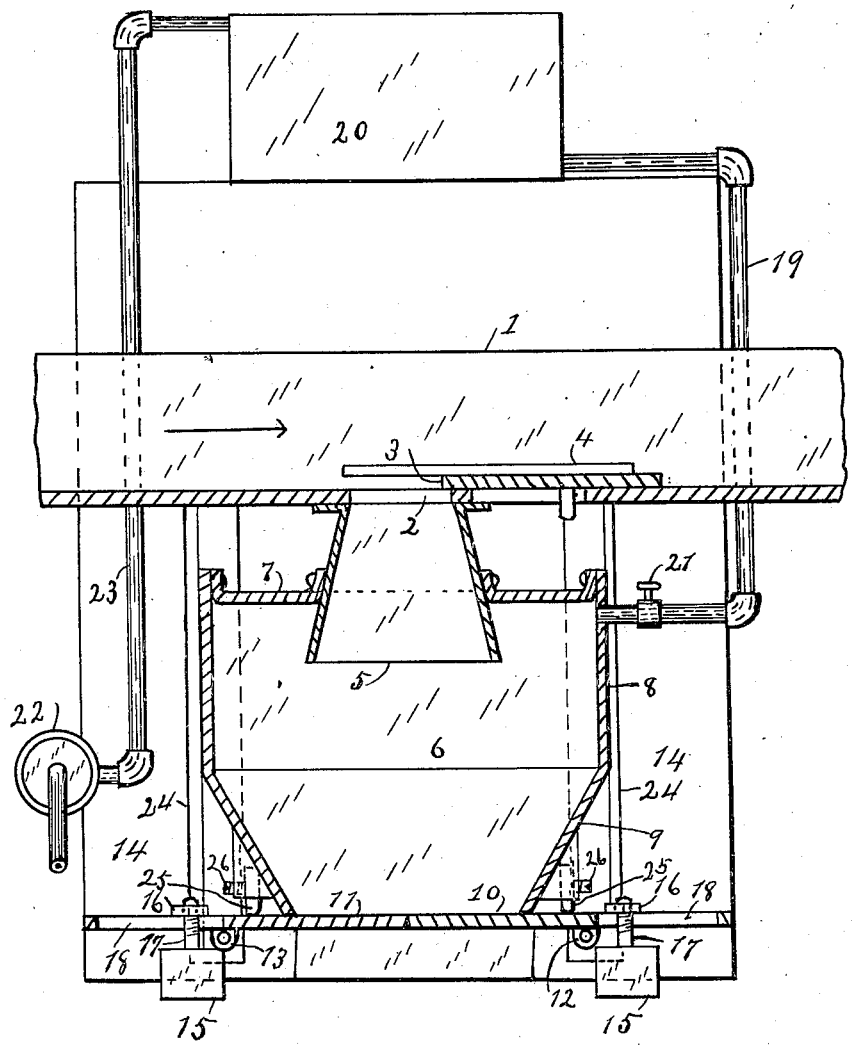
Inventor
N. O. Harmon
By E. Barpham
Attorney Patented Sept. 4, 1923.

1,467,285

UNITED STATES PATENT OFFICE.

NATHANIEL O. HARMON, OF LOS ANGELES, CALIFORNIA.

HYDRAULIC CLASSIFIER.

Application filed October 24, 1921. Serial No. 509,967.

*To all whom it may concern:*

Be it known that I, NATHANIEL O. HARMON, a citizen of the United States, residing at the city of Los Angeles, county of Los Angeles, State of California, have invented new and useful Improvements in Hydraulic Classifiers, of which the following is a specification.

My invention relates to an apparatus for separating material composed of parts of different specific gravity by means of a current of water so proportioned that the heavier material will fall through the current of water while the lighter material will flow on with the current of water, and the object thereof is to produce an apparatus of simple construction which can be operated with a minimum supply of water. A further object is to produce an apparatus in which the separation of material is continuous.

The drawings forming a part of this application is a side elevation partly in section of my improved apparatus represented diagrammatically.

Referring to the drawings 1 is a launder in which the material to be separated flows in the direction of the arrow. Extending across the bottom of the launder is a port or opening 2 which may be partly or wholly closed by gate 3, which gate is slidable in ways 4 formed on the sides of the launder. Below port 2 is a chute 5 which opens into the concentrate chamber 6 a short distance below the flexible top wall 7. The upper portions 8 of the side walls of chamber 6 are preferably vertical and the bottom portions of the side walls preferably taper inwardly. The bottom of chamber 6 is composed of two gates 10 and 11 which are pivoted in bearings 12 and 13 secured to side walls 14 of the launder. These gates carry counter-balancing weights 15 which are adjustable thereon and may be held positioned by nuts 16 on weight stems 17 which are slidable in slots 18 in the gates. A pipe 19 is connected to a tank 20 and runs to chamber 6. A portion of this pipe is flexible. A valve 21, on this pipe forms regulating means to control the water that flows into chamber 6. A pump 22 may pump water from a source of supply and deliver the same through pipe 23 into the tank, or the tank may be supplied from a water supply under pressure. Where a water supply under pressure is obtainable the tank and pump could be dispensed with and the water under pressure could be discharged into chamber 6 preferably near the top. Guides 24 guide chamber 6 in its vertical movement. Bars 25 are secured to chamber 6 and bear against the gates near their pivots so that when there is weight in the chamber bars 25 will positively open the gates as the flexible top permits the chamber to descend. I could make the top of chamber 6 rigid and the chamber rigid to the sides 14 but I prefer the construction described as it causes a positive opening of the gates. Bars 25 are adjustable by means of set screws 26.

In the operation of my classifier the material to be separated is fed into the upper end of the launder with sufficient water to make it flow freely down the launder in the direction of the arrow. At the same time water is fed into chamber 6 so as to fill the same and to cause it to flow up into the launder with sufficient velocity to prevent the lighter material from pasing down chute 5 but not sufficient to prevent the heavier material from falling down the chute through the water. The weights on the gates are so adjusted that the gates are kept closed until there is a quantity of material collected in chamber 6. The further inflow of material into chamber 6 will cause the gates to open and thereafter permit as much material to pass out through the gates as flows in through the chute, thereby making the separation continuous. The heavier material may be taken away by any suitable means. Tank 20 is elevated to give the desired velocity to the water flowing through chute 5. In some cases I may feed dry pulverized material directly into port 2.

By this construction a cheap and efficient apparatus is provided that will separate ore particles from the gangue, will separate sand from the impurities usually found therein, and is susceptible of many other uses. By having a gate to control the size of port 2, and by having a valve to control the flow of water into chamber 6 my apparatus can be used for many purposes. By having chute 5 extend a short distance into chamber 6, and by having the water supply enter the chamber near the top a uniform current of water is caused to flow up the chute.

Having described my invention I claim.

1. A classifier comprising in combination a launder having a port in the bottom thereof; a chamber below said port, said chamber having a flexible top wall, a chute surrounding said port and extending into said chamber through the top, said flexible top being secured to said chute; means to supply water under pressure into said chamber; and regulatable means for automatically controlling the outflow of material through the bottom of the chamber said outflow of material being continuous.

2. A classifier for matter composed of particles of different atomic specific gravity in a mobile condition comprising a receptacle into which such matter falls; means to admit water under pressure into such receptacle to cause the separation of the matter and to cause the lighter matter to be carried out of the top of the receptacle and away from the heavier matter; means to regulate the quantity of matter admitted into said receptacle; regulatable means for automatically permitting a continuous outflow of the heavier material from the bottom of said receptacle.

In witness that I claim the foregoing I have hereunto subscribed my name this 18th day of October, 1921.

NATHANIEL O. HARMON.